UNITED STATES PATENT OFFICE.

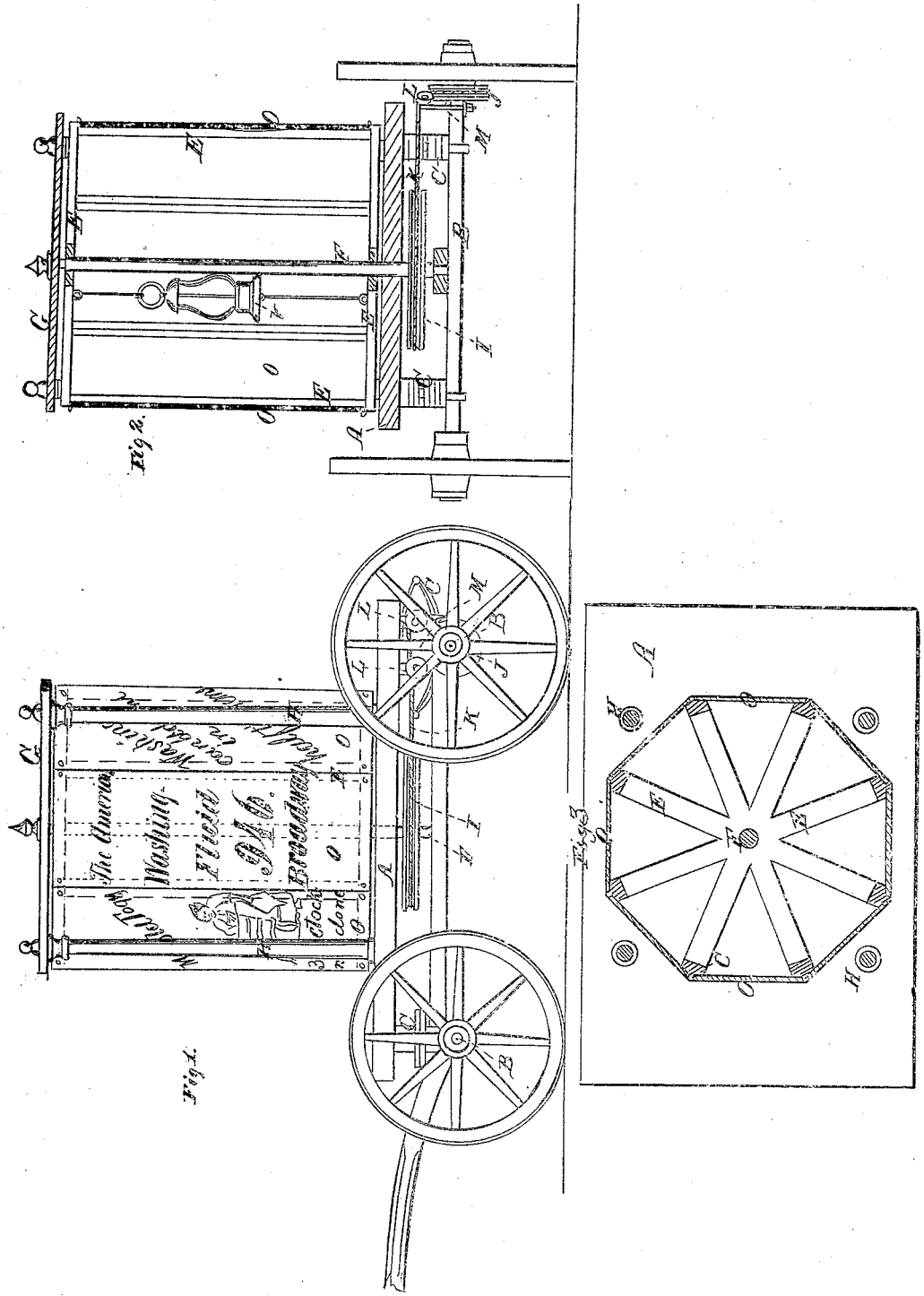

GEORGE W. THOMPSON, OF NEW YORK, N. Y.

IMPROVEMENT IN WAGONS FOR ADVERTISING.

Specification forming part of Letters Patent No. 78,552, dated June 2, 1868; antedated May 25, 1868.

*To all whom it may concern:*

Be it known that I, GEORGE W. THOMPSON, of the city, county, and State of New York, have made certain new and useful Improvements in Advertising-Wagons; and I do hereby declare that the following is a full, clear, and exact description of the same, reference being had to the accompanying drawings, making part of this specification, in which—

Figure 1 represents a side elevation of my improved wagon. Fig. 2 is a vertical cross-section of the same. Fig. 3 is a horizontal section of the revolving drum of the same.

Similar letters of reference indicate corresponding parts in the several figures.

The nature of my invention consists in having a vertically-arranged revolving reel upon the platform of a wagon, upon the periphery of which transparent signs for advertising are placed, so that when a light is placed within and the wagon is set in motion at night the signs are illuminated and are revolved by the motion of the wagon, whereby more astonishment is produced and more notice taken of the specific advertisement by the public, and the spectator is more fully caused to read and see the advertisement in particular than with advertising wagons or mediums heretofore known or used.

To enable others skilled in the art to make and use my invention, I will proceed to describe the construction and operation.

A represents the body or platform of the wagon. The wheels B, axles C, and springs D, upon which the body rests, are all made in any ordinary way.

E represents a polygonal reel, with an axle, F, arranged vertically upon the platform.

G is a fixed top over the reel, and rests upon posts H H, and serves as a bearing for the upper end of the axle of the reel, the lower end being guided in the platform or body of the wagon. In certain cases it may be preferable to rest and guide it as well in the running-gear of the wagon, as shown in the drawings.

I is a large pulley, fixed upon the lower end of the axle F, and a small pulley, J, is fixed on the hub of one of the hind wheels of the wagon; and in order to guide and run a belt, K, transmitting the motion from the pulley J on the hub of the wheel to the reel, I provide two guide-pulleys, L L, pivoted to a support, M, bolted to the hind axle of the wagon, as shown in Figs. 1 and 2, in proper position to guide the belt K on the pulley J, nevertheless the up-and-down motion of the wheels. Now, on each of the open sides of the reel I place one of the advertisements or signs, which are painted on rectangular sheets of transparent paper or cloth, each of the size to cover one of the sides of the reel, and in order that these signs may be made more durable, so as to be re-covered or taken off the reel, I provide the edges of the signs with a wooden frame.

In order to illuminate the reel and the advertising-signs when used at night, I place and secure a lantern, N, inside the reel, as shown in Fig. 2.

From the foregoing it is clearly seen that the signs presented on a vertically-arranged reel or drum afford ready view to the spectator; nevertheless, being revolving and with little expense, the said drum and signs may be made of a large size and contain a great deal of advertising-matter, and the appearance of them, more especially at night, engages the spectator to great interest.

Having fully described my invention, what I claim therein, and desire to secure by Letters Patent, is—

1. The employment of the vertically-arranged revolving drum of advertisements or signs, substantially as and for the purposes herein shown.

2. The arrangement of the pulley J, with the guide-pulleys L L and the pulley I, for transmitting motion to the axle F, substantially as and for the purpose stated.

GEO. W. THOMPSON.

Witnesses:
R. BOEKLEN,
JAS. CHAPMAN.